Aug. 9, 1955

A. M. JOUBAN 2,714,781

TELEPHONE STAND

Filed Sept. 11, 1951

2 Sheets-Sheet 1

INVENTOR

ALBERT M. JOUBAN

BY Wilkinson & Mawhinney

ATTORNEYS

TELEPHONE STAND

Filed Sept. 11, 1951 2 Sheets-Sheet 2

INVENTOR
ALBERT M. JOUBAN

BY Wilkinson & Mawhinney
ATTORNEYS

United States Patent Office 2,714,781

Patented Aug. 9, 1955

2,714,781

TELEPHONE STAND

Albert M. Jouban, Lafayette, La.

Application September 11, 1951, Serial No. 246,042

2 Claims. (Cl. 45—.5)

This invention appertains to improvements in telephone accessories and has for its primary object to provide a telephone stand, which is adapted to be supported in a vertical position adjacent the base of a telephone and which is constructed to contain index cards, memorandum paper, calendar, telephone books and ancillary accessories, which are needed or can be utilized to value in placing and receiving telephone calls.

A further object of this invention is to provide a compact, inexpensive and attractive stand, which can be vertically mounted on a table top or similar support and on which the base of the telephone can be seated, so that the stand projects upwardly at the rear of the base and is formed to contain various devices, which are usable in making and receiving telephone calls and which can be easily and conveniently employed while engaged in telephoning.

These and ancillary objects and structural features of merit are attained by this invention, the preferred embodiments of which are set forth in the following description and illustrated in the accompanying drawings, wherein.

Figures 1, 2, 3:
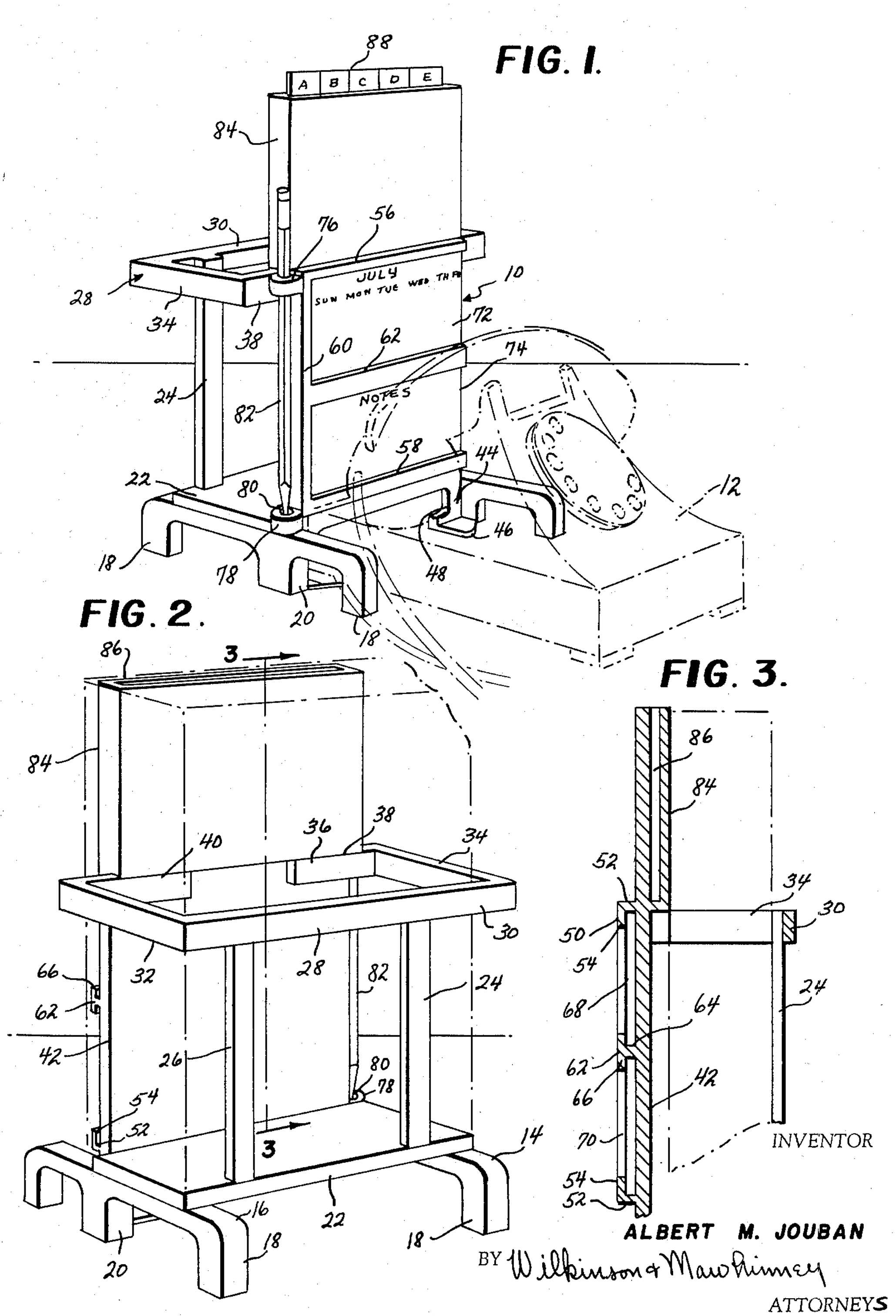
Fig. 1 is a view in perspective of one embodiment of this invention, illustrating the telephone stand in its upstanding mounted position at the rear of the base of the telephone.
Fig. 2 is a view in perspective of the stand per se.
Fig. 3 is a fragmentary vertical sectional view taken on line 3—3 of Fig. 2.
Figure 4:
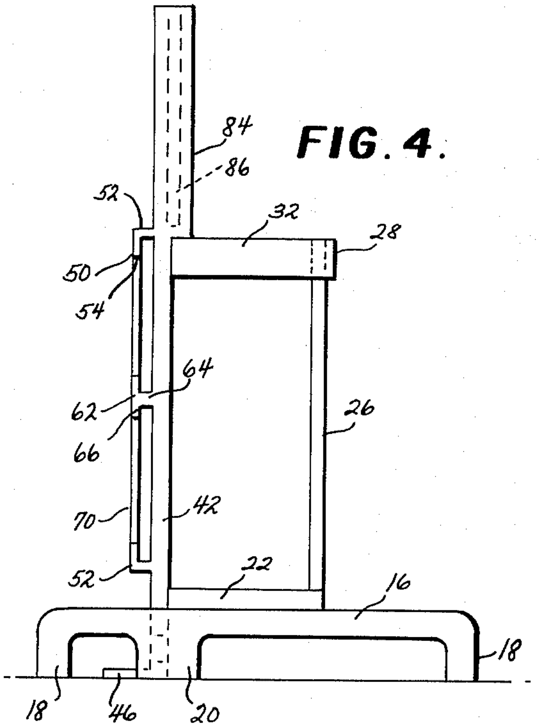
Fig. 4 is a side elevational view of the stand.

Referring now more particularly to the accompanying drawings, and initially to Figs. 1 through 4, the reference numeral 10 generally designates a telephone stand, which is adapted to be positioned rearwardly of the base 12 of a conventional telephone and which is supported in an upstanding position at the rear of the base 12 partly by means of the base so that the stand is, in effect, attached to the base.

The stand includes longitudinal side bars 14 and 16, which are spaced apart sufficiently to receive the base 12 of a telephone longitudinally therebetween and which are formed at their opposing ends with depending legs 18 and intermediate the ends with a depending leg 20. A space between the legs 18 and 20 is provided, as seen in Fig. 1 to receive the wire leading from the base. A platform 22 is transversely mounted on the upper edges of the side bars and upstanding bars 24 and 26 are secured at their lower edges to the rearward edge of the platform. An open rectangular frame 28 is secured at its side 30 to the upper ends of the bars 24 and 26 and is horizontally arranged so that the ends 32 and 34 of the frame are disposed outwardly from the opposing ends of the platform. The side 36 of the frame is formed with a center opening, so that the side 36 is divided into end sections 38 and 40.

A flat plate or panel 42 is provided and is disposed vertically between the side bars 14 and 16, the lower end of the panel being formed at its corners with depending legs 44, which are arranged at right angles to the legs 20 on the side bars and are suitably fixed to the inner surfaces thereof. Lateral feet 46 are formed integral with the lower offset ends 48 of the legs and are arranged normal thereto, the feet providing mounts for the base 12 of the phone, which is positioned between the forwardly extending ends of the side bars 14 and 16 and seated at its rear end on the feet, as seen in Fig. 1.

A U-shaped frame 50, which is angular in cross-section, is secured at its flange 52 to the front face of the plate 42, so that the flange 54 is in spaced parallel relation thereto. The legs 56 and 58 of the frame 50 are arranged in parallel relation transversely of the panel 42, with the web 60 of the frame being disposed along one of the marginal side edges of the panel. A T-shaped bar 62 extends laterally from the web portion 60 and is spaced from the legs 56 and 58 in parallel relation thereto, the flange 64 of the T-bar 62 abutting the panel 42 and being secured thereto with the head 66 being spaced from the panel. Thus the head 62 and flanges 54 of the frame 50 lie in the same vertical plane and form an upper holder 68 and a lower holder 70. The upper holder slidably receives a calendar 72, while the lower holder slidably retains a memorandum pad or loose sheets of paper 74.

An apertured ear 76 extends laterally from the side edge of the panel 42 and the web 60 of the frame 50 and overlies an ear 78, which is formed in the center with a depression 80. The ears 76 and 78 form a supporting means for a pencil 82 or similar writing instrument, so that the pencil is conveniently mounted and located adjacent to the memorandum paper. The pencil is slidably disposed through the aperture in the ear 76, and the point is protectively seated in the depression 80 in the ear 78.

The ends 38 and 40 of the side 36 of the open rectangular frame 28 are suitably secured to the rear face of the panel 42 by adhesive or similar means, so that the frame is fixed to the panel 42 and supported in a horizontal position above the platform 22.

The upper end 84 of the panel is enlarged rearwardly and is formed with a vertical slot 86, open at its upper end, which is provided to retain a number of index cards 88, on which various data, such as addresses, telephone numbers or the like can be written.

As can be seen in Fig. 1, the side bars 14 and 16 are spaced apart so as to accommodate the base 12 of the telephone, the base resting on the feet 46 and, thereby, assisting the side bars in retaining the frame in an upstanding position.

The calendar 72 is arranged in a conspicuous placed for quick reference and the memorandum paper 74 is disposed, so that it can be easily withdrawn for writing or else used while in the holder. The pencil 82 is located in an adjoining position, so that it can easily be withdrawn from its holder and used.

Also, for quick and convenient consultation, the index cards 88 are easily removable from the slot 86 in the upper end 84 of the panel 42 and are preferably formed with indexing tabs, which project upwardly above the end of the panel.

The platform 22 is of a size to accommodate telephone books, which are placed in upstanding positions on the platform and held in position by the frame 28, the panel 42 and the bars 24 and 26.

Figure 6:
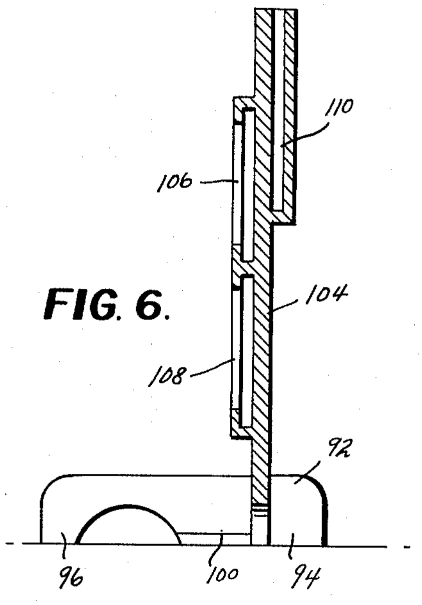
Fig. 6 is a vertical sectional view taken on line 6—6 of Fig. 5.
Figure 5:
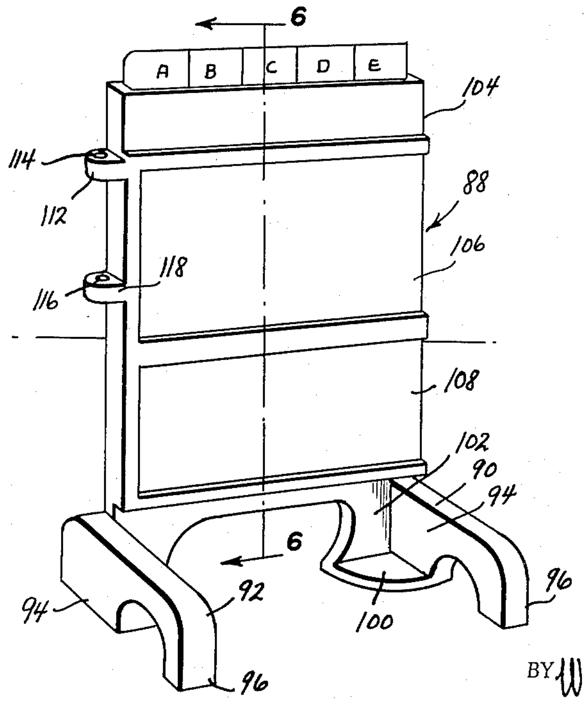
Fig. 5 is a view in perspective of another embodiment of this invention.
Figure 7:
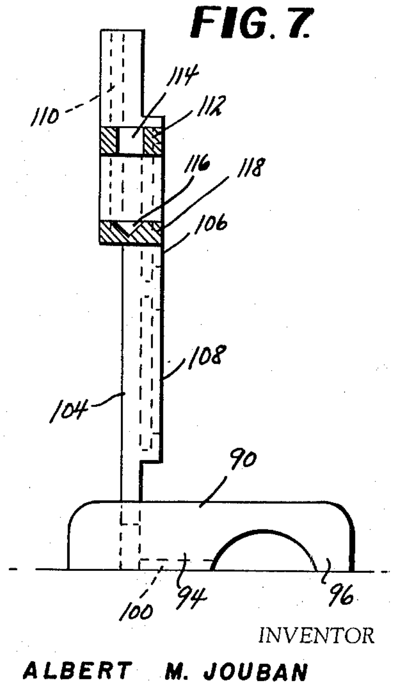
Fig. 7 is a side elevational view of the stand, illustrated in Fig. 5.

In Figs. 5 through 7, inclusive, another form of this invention is illustrated, wherein the stand 88 includes spaced longitudinal side bars 90 and 92, which are formed with elongated end legs 94 and opposing short end legs 96. Horizontal feet or webs 100 are formed integral with the legs 94 and extend laterally inwardly therefrom at right angles thereto, the feet being integral with the legs 102, which support the panel 104 in an upstanding position. The panel 104 is disposed perpendicular to the side bars and arranged between the ends of the side bars. Holders 106 and 108 are arranged transversely on the front face of the plate, in a manner identical to the construction of the holders 68 and 70 and the upper end of the panel is vertically formed with an enlarged slot 110 to house the index cards.

A ring 112 is formed on one side edge of the panel 104 and the bore 114 therein overlies and is aligned with a conical depression 116 formed in an ear 118, which underlies the ring, the ring and ear being provided for supporting a conventional pencil or other writing instrument.

The telephone stand 88 is employed in a manner similar to the use of the stand 10, with the base of the telephone resting on the feet 100 and assisting the side bars in retaining the panel and frame in an upstanding position. However, the stand 88 is not provided with a frame structure for housing telephone books, such as the platform 22 and the frame formed on the stand 10.

It can thus be seen that compact and inexpensive stands are provided, which are easily mounted vertically at the rear of a telephone stand and which contain various accessories for convenient use in placing and receiving telephone calls. Thus, the stands house, within a small space immediately adjacent to the telephone, the various adjuncts, that may be required or used to value in placing and receiving telephone calls, such as the calendar, writing pad or memorandum paper, pencil or similar writing instrument, index cards, containing addresses, telephone numbers and the like, and telephone books.

Of course, since other forms of the invention can be resorted to, limitation is sought only in accordance with the terms of the appended claims.

Having thus described this invention, what is claimed is:

1. A telephone stand comprising a pair of parallel side bars spaced apart just sufficient to straddle and to receive longitudinally therebetween the base of a telephone, an upstanding panel having its lower end portion connected to said side bars for holding the side bars in their spaced apart relation, means on the side bars and panel adapted to receive thereon the rear end of the telephone base, a platform carried by said side bars, an open rectangular frame disposed vertically above said platform, upstanding members connected to said platform and frame for supporting said frame, said frame being connected to said panel to brace the panel and cooperating with the panel, the platform and the upstanding members to define a telephone book receiving space, the lower portion of said panel being thin, and a substantially E-shaped frame having its three legs secured to the thin portion of the panel at vertically spaced apart areas to reinforce the thin portion of the panel and to cooperate therewith to provide an upper calendar receiving holder and a lower memorandum pad receiving holder, the upper portion of the panel being of increased thickness to impart stability thereto and having formed therein a vertical slot for receiving index cards.

2. A telephone stand comprising a pair of parallel side bars spaced apart just sufficient to straddle and to receive longitudinally therebetween the base of a telephone, an upstanding panel mounted transversely between the side bars for supporting the panel and for holding the side bars in their spaced apart relation, mounts on said side bars and panel for receiving the rear end of the telephone base, a substantially E-shaped frame having its three legs secured to the panel at vertically spaced apart areas to reinforce the panel and to cooperate therewith to provide an upper calendar receiving holder and a lower loose paper sheets receiving holder, and a pair of vertically spaced apart ears secured to said panel and frame to supplement the attachment of the frame to the panel, the upper of said ears having a through bore therein and the lower of said ears having a depression therein in vertical alignment with the bore in the upper ear.

References Cited in the file of this patent

UNITED STATES PATENTS

| | | |
|---|---|---|
| 423,982 | Brooks | Mar. 25, 1890 |
| 1,148,742 | Bernstein | Aug. 3, 1915 |
| 1,731,422 | Johnson | Oct. 15, 1929 |
| 1,983,443 | Duceska et al. | Dec. 4, 1934 |
| 2,080,995 | Baker et al. | May 18, 1937 |
| 2,210,350 | Van Delle | Aug. 6, 1940 |
| 2,252,306 | Raucci | Aug. 12, 1941 |
| 2,509,793 | Yost | May 30, 1950 |
| 2,574,425 | Thompson | Nov. 6, 1951 |